United States Patent [19]

Dankoff et al.

[11] 3,997,359
[45] * Dec. 14, 1976

[54] RECLAMATION OF COMPONENTS FROM GRINDING SWARF

[76] Inventors: Joseph Daniel Dankoff, P.O. Box 19, R.D. 5; David Kent Snyder, 1167 Ridgeview Drive, both of Latrobe, Pa. 15650

[ * ] Notice: The portion of the term of this patent subsequent to Feb. 11, 1992, has been disclaimed.

[22] Filed: Oct. 2, 1974

[21] Appl. No.: 511,198

Related U.S. Application Data

[63] Continuation-in-part of Ser. No. 304,385, Nov. 7, 1972, Pat. No. 3,865,629.

[52] U.S. Cl. .................................. 134/10; 134/12; 134/19; 134/25 R; 134/26; 209/214
[51] Int. Cl.² ......................................... B08B 3/10
[58] Field of Search ............. 134/10, 12, 19, 25 R, 134/26, 2, 40, 41, 42; 241/24; 209/214, 3, 11, 38

[56] References Cited

UNITED STATES PATENTS

| | | | |
|---|---|---|---|
| 2,714,574 | 8/1955 | Kearney | 134/25 R |
| 3,544,369 | 12/1967 | Keogh, Jr. | 134/10 |
| 3,573,212 | 3/1971 | Flix | 134/40 X |
| 3,865,629 | 2/1975 | Dankoff et al. | 134/19 |

*Primary Examiner*—Arthur D. Kellogg
*Attorney, Agent, or Firm*—Parmelee, Miller, Welsh & Kratz

[57] ABSTRACT

A process for the recovery in a usable condition of one or more components of grinding swarf comprises grinding and screening the swarf where necessary, mixing and washing it first with a hydrocarbon or chlorinated hydrocarbon combined with a surfactant and the removal of the bulk of the resulting solution is effected, following which the resulting swarf is then washed one or more times with a solvent for grease and oil with no added surfactant. Again the bulk of the resulting solution is first removed leaving a product moist with some remaining solution. This product is then heated in a closed environment to remove the residual solution by volatilization. Depending on the component in the original swarf which is to be recovered, magnetic separation of the steel from abrasive particles may be effected at some stage, and abrasive grains of different compositions can be separated. The used solvent without surfactant can be processed for reuse and the lubricant recovered.

8 Claims, 1 Drawing Figure

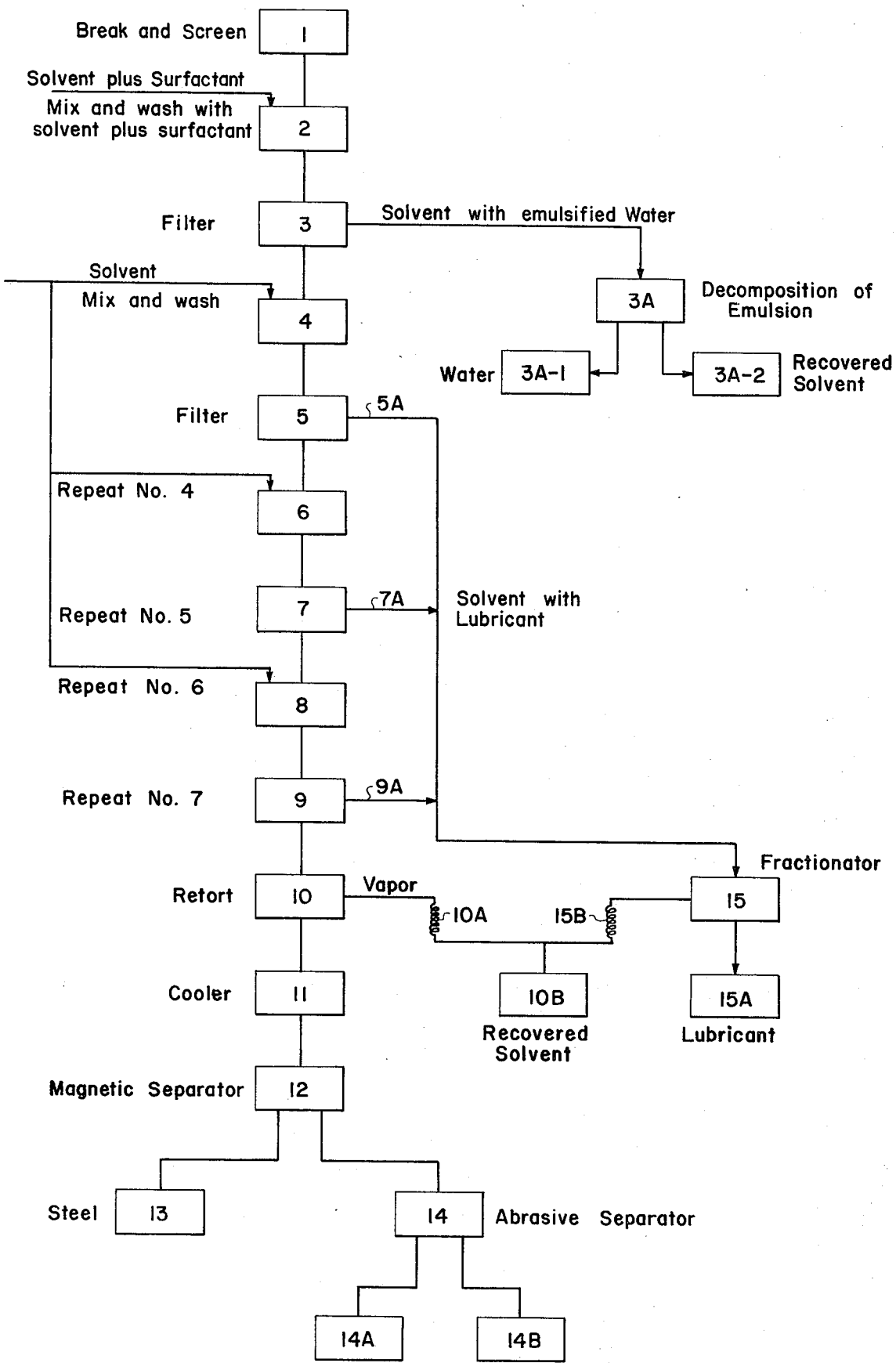

3,997,359

RECLAMATION OF COMPONENTS FROM GRINDING SWARF

This invention is for an inprovement in and constitutes a continuation-in-part of our pending application Ser. No. 304,385, filed Nov. 7, 1972, now U.S. Pat. No. 3,865,629 and like said earlier-filed application is for the processing of grinding swarf to recover one or more of the constituents thereof. The invention is especially useful for the removal of steel particles and especially those particles resulting from the grinding and finishing of the more expensive alloy steel products.

BACKGROUND

In said earlier-filed application which, so far as relevant is incorporated herein by reference, it is explained that in industrial shaping or finishing steel articles of manufacture they are commonly subjected to grinding operations wherein a coolant comprising water combined with a water miscible or soluble lubricant is employed. As a result a detritus, known as swarf, is produced of metal fragments, abrasive particles and lubricant-coolant residue.

The swarf so produced has heretofore had little value because it cannot be economically recycled to produce useful products. It is explained in our earlier application that the residue of lubricant-coolant has presented a major obstacle to the recovery of the steel particles and/or the abrasive. It is further explained that under usual conditions in which swarf is accumulated or stored, the mixture commonly forms into irregular lumps and as a first step in the treating of such material it is ground, where necessary, to break up lumps, and screened to remove foreign bodies, such as pieces of scrap metal, that may have become mixed with the swarf.

With the process disclosed in our co-pending application, the swarf is first washed with a hydrophilic solvent, such as methanol which dissolves the water phase and certain proprietary additives that may be used in combining the water and mineral oil or other lubricant comprising the coolant-lubricant system, but it does not dissolve the lubricant to any appreciable extent. After agitating the swarf with the methanol, the methanol and water is removed in a well-known manner as by filtration or centrifuging and the swarf, now substantially free of water is washed with a hydrocarbon or chlorinated hydrocarbon to dissolve the lubricant phase of the coolant-lubricant, kerosene being a satisfactory hydrocarbon solvent for this purpose. Usually there are two, and typically more, such washings with removal of the solvent and included lubricant after each washing. The final step involves vaporizing any residual solvent from the cleaned swarf in a retort from which the vapors are condensed to recover the solvent. By subsequent fractionation, the second solvent and lubricant may be separated and the solvent reused. At some stage, depending on whether the abrasives as well as the metal values are to be recovered, separation of the metal abrasive is effected. With steel swarf a magnetic separator is used. It is further explained that where important, mixed abrasive particles, such as silicon carbide and aluminum oxide may be electrostatically separated. The metal is recovered in its finely-divided powdered form ready for use in powder metallurgy and elsewhere.

THE PRESENT INVENTION

We have now discovered that if, instead of using a hydrophilic solvent, such as methanol, we combine with the second solvent of the prior application, typically kerosene, a synthetic surfactant, we can remove for practical purposes substantially all of the water, any not removed being in an unimportant amount or only a trace. At the same time a substantial amount of the lubricant is also removed from the swarf in the first step. Thereafter the procedure is generally the same as that disclosed in our first application, that is, the product resulting from the use of the combined solvent and surfactant is then washed one or more times with solvent without surfactant and eventually it is heated in a closed environment or retort to effect final removal of traces of solvent. Also after the first washing with solvent combined with a surfactant swarf produced with oil-based lubricants may be combined with the dewatered swarf, or it may be processed, omitting the dewatering step.

DETAILED DESCRIPTION OF THE INVENTION

The accompanying drawing is a schematic flow diagram explanatory of the invention.

In the practice of this invention as above explained, the swarf, which may have agglomerated in storage in irregular lumps, is first ground and screened to break up the lumps and remove foreign bodies, such as pieces of scrap metal. Two cases must now be distinguished. In the case of the previously-described water-based lubricant-coolant with emulsified mineral oil, the screened swarf is intimately mixed with a hydrocarbon such as kerosene or a chlorinated hydrocarbon solvent to which has been added a synthetic surfactant such as linear alkyl sulfonate or nonylphenoxypoly (ethyleneoxy) ethanol, these being typical but not exclusive. Typically snythetic surfactants comprise a polar group attached to a hydrocarbon chain. The surfactant, which is premixed with the hydrocarbon or chlorinated hydrocarbon solvent, is added to promote an emulsion of the water portion of the lubricant-coolant with the solvent while also effecting removal of some of the lubricant.

After separation of this solvent-water emulsion from the mixture, as for example by filtration, the swarf, now free for all practical purposes of water, is washed again with the aforementioned solvent which now may be used without a surfactant additive. With most of the water now removed this second wash is effective for the extraction of the lubricant portion of the lubricant-coolant.

In the second case of oil-based lubricant-coolants, it is unnecessary to add surfactant to the solvent as in the case of water-based lubricants. Processing of these swarfs proceeds exactly as in the water-based swarfs, but without the necessity of the first wash in solvent with surfactant additive.

Washing in the solvent without the surfactant after removal of the bulk of the water is preferably repeated two or more times with the removal of the bulk of the solvent with dissolved lubricant after each washing by filtering or otherwise, and after the final washing if not the others, as much as possible of the solvent with contained lubricant as is feasible is removed by filtering or other liquid-solid separation steps such as centrifuging.

After the final washing with solvent there will nevertheless be some solvent retained in the mass; the material is then heated in a retort to vaporize the residual solvent and last traces of lubricant. The vaporized solvent additionally forms a reducing atmosphere around the heated metallic patches preventing oxidation during heating and cooling. The solvent is collected for recycling by condensation. The metal and abrasive particles may then be magnetically separated and the steel is available for use in powdered metallurgy or for other commercial purposes. Likewise, the abrasive, if comprised of mixed grits, such as silicon carbide and aluminum oxide, may be separated, as for example, by electrostatic separation, and reused. The kerosene may be freed of lubricant for reuse as the second solvent by known procedures, such as fractionation, while recovering the lubricant as a commercial product.

It is noted that the kerosene-water emulsion associated with the first wash of the water-based swarf using the surfactant can be rendered unstable by well-known methods such as heating, settling, or by additions of electrolytes. In so doing, the kerosene with contained lubricant can be separated from the water and thereby be reused either as fuel for vaporization in the retort or as solvent wash solution. Where only the steel component is to be recovered, magnetic separation may precede either the first or second washings, but important in any case is the preliminary removal of water, in the case of water bearing swarf, by use of a surfactant additive to the solvent. This step leaves the lubricant in a condition to be effectively dissolved in subsequent washes in solvent which may now be used without a surfactant addition. Although heat could be used to remove the water by vaporization, the use of surfactant to gain an emulsion of water in a hydrocarbon carrier medium is more feasible and economical in most cases. The surfactant usually ranges between ¼% and 10% by volume of the kerosene-surfactant mixture; with the surfactants above named about ½% has been found to be adequate.

The accompanying drawing is a flow diagram of the preferred method illustration the successive steps of the most complete procedure.

In the schematic flow diagram 1 designates a lump breaking and screening apparatus where agglomerated masses of swarf are broken down to a size where the material may be effectively washed and foreign bodies such as stray pieces of iron or steel are removed. The screened material is discharged from the screening unit 1 into the first mixer and the washer 2 where it is mixed and agitated with solvent with surfactant additive. The preferred solvent is kerosene, but other hydrocarbon or chlorinated hydrocarbon solvents capable of dissolving grease or oil may be used. The surfactant desirably is nonylphenoxypoly (ethyleneoxy) ethanol, but any other surfactant capable of establishing an emulsion of water in a solvent carrier medium such as kerosene is suitable.

After being thoroughly washed with solvent plus surfactant additive the mixture is transferred to a filter or separator 3. The filter may be of a well-known type where air pressure or vacuum is used, but other methods of filtration such as centrifuging are also suitable. The bulk of the solvent-water solution is removed from the swarf in this filter and the swarf, as indicated at 4, is then mixed with fresh solvent, which this time does not contain added surfactant. In the case of oil-based lubricant-coolants, steps 2 and 3 are not required, and one can proceed directly from step 1 to 4.

After the first mixing and washing with the surfactant-free solvent, the mixture is processed to remove the bulk of the kerosene-lubricant solution, as for example, by filtration under pressure or vacuum as indicated at 5. The filtrate is removed at 5A. As previously indicated, two or more washings with kerosene are desirable, and 6 designates another mixing and washing stage. The second mixture is also processed at 7 to remove the bulk of the solvent with additional lubricant, again filtering under pressure or vacuum, and then the filtrate removed at 7A. Generally a third mixing with the surfactant-free solvent is desirable. This is indicated at 8 and the bulk of the solvent is again extracted, desirably by pressurized or vacuum filtering, indicated at 9. The filtrate is removed at 9A.

Since the final step of filtering cannot completely remove every trace of solvent and lubricant, the residue from the third filtering step, which may perhaps be described as "kerosene moist" solid residue, is sealed inside an air-tight retort and heated from an external heat source until this last trace of kerosene-lubricant mixture is substantially entirely, if not completely eliminated. This occurs when the mass reaches a temperature in the range between 600° to 1000° F. In the flow diagram, 10 designates this step. As above pointed out the vapors generated during this heating step provide a non-oxidizing atmosphere to protect the metal particles both during heating and in the subsequent cooling of the particles in the air-tight retort, while excess vapors produced in the retort are conducted to a condenser 10A and the condensate collected in a receiving vessel 10B.

The dried and degreased solids are cooled at 11 and then at 12 processed through a magnetic separator with the steel particles being collected in receiver 13 and the abrasive particles pass into receiver and/or separator 14. Normally these abrasive particles will be a mixture of silicon carbide and aluminum oxide and for reuse, they may be electrostatically separated by known methods, the separated particles being discharged at 14A and 14B respectively.

The filtrate removed at 5A, 7A, and 9A may be carried through a common duct to a fractionating unit or other equipment known in the petroleum refining industry as indicated at 15 to separate the kerosene and the lubricant. The kerosene from which the lubricant has been stripped is discharged through 15B to the solvent receiver 10B and the lubricant collected in a receiver 15A.

As indicated in step 3A, the kerosene-water emulsion is decomposed by heating or settling to yield water and kerosene in 3A-1 and 3A-2 respectively.

As previously explained, the order of the steps, especially insofar as magnetic separation is involved may be varied, particularly if the recovery of steel particles only should be important. In many instances, the grinding swarf results from the grinding of specialty steels or steel alloys, tool steel, for example, being one of these, and the recovered steel particles may be highly useful in powdered metallurgy, some other sintering or forming operation, or briquetted or pelletized for further use. In a typical grinding swarf resulting from high speed tool steel, the content averaged about 75% steel particles, 20% to 23% abrasive particles, and the remainder was the lubricant-coolant mixture.

We claim:

1. In the process of extracting one or more components of grinding swarf wherein a coolant-lubricant has been used in generating the swarf and in which the swarf, if necessary is first ground and screened, and then first washed with a solvent to remove water from the swarf and the solvent combined with water removed and after removal of the water the swarf is then washed at least once in a lubricant removing solvent selected from the group consisting of liquid hydrocarbons and chlorinated liquid hydrocarbons, separating the solvent with dissolved lubricant from the swarf, followed by heating the now washed swarf in a closed environment such that air is substantially eliminated to a temperature sufficiently high enough to remove from the swarf as vapor residual solvent and remaining traces of lubricant, the invention which comprises using as a solvent for first effecting the removal of the water from the swarf a lubricant removing solvent selected from the group consisting of liquid hydrocarbons and chlorinated liquid hydrocarbons combined with a synthetic surfactant.

2. The invention defined in claim 1 in which the solvent is kerosene.

3. The invention defined in claim 1 in which the surfactant comprises from ¼% to 10% by volume of the solvent-surfactant mixture.

4. The invention defined in claim 1 in which the solvent is kerosene and the surfactant is selected from the group consisting of a linear alkyl sulfonate and nonylphenoxy (ethyleneoxy) ethanol.

5. The invention defined in claim 1 in which at some stage in the process the swarf is separated into metal values and abrasive particles.

6. The invention defined in claim 1 in which the metal particles are separated from the abrasive particles after the washing and solvent removal has been completed and both the metal and the abrasive are free of solvent and lubricant.

7. The method defined in claim 1 in which swarf produced with an oil-based lubricant only is combined with the swarf produced from a water-lubricant combination after the latter has first been washed with the combined surfactant-solvent mixture.

8. In the process of recovering metal particles from grinding swarf wherein the swarf has been generated by a liquid coolant containing lubricant which remains on said particles, the steps comprising:
 a. washing the metal particles to be recovered a plurality of times in a solvent for the lubricant and mechanically separating the solvents from the solid particles after each such washing;
 b. after the final step of washing with solvent and separation of the liquid from the solid particles but with the solid particles moist with a residuum of the liquid;
 c. charging said moist particles into a closed air-excluding environment and heating them to a temperature ranging between 600° and 1000° F. to vaporize the remaining solvent from the metal particles together with such traces of lubricant as remains on the particles or in the residuum of solvent, withdrawing the vapors so produced from said closed environment;
 d. finally cooling the particles in said environment out of contact with the air to a temperature where immediate oxidation of the particles will not occur and removing them from the said closed environment.

\* \* \* \* \*